Figure 1:
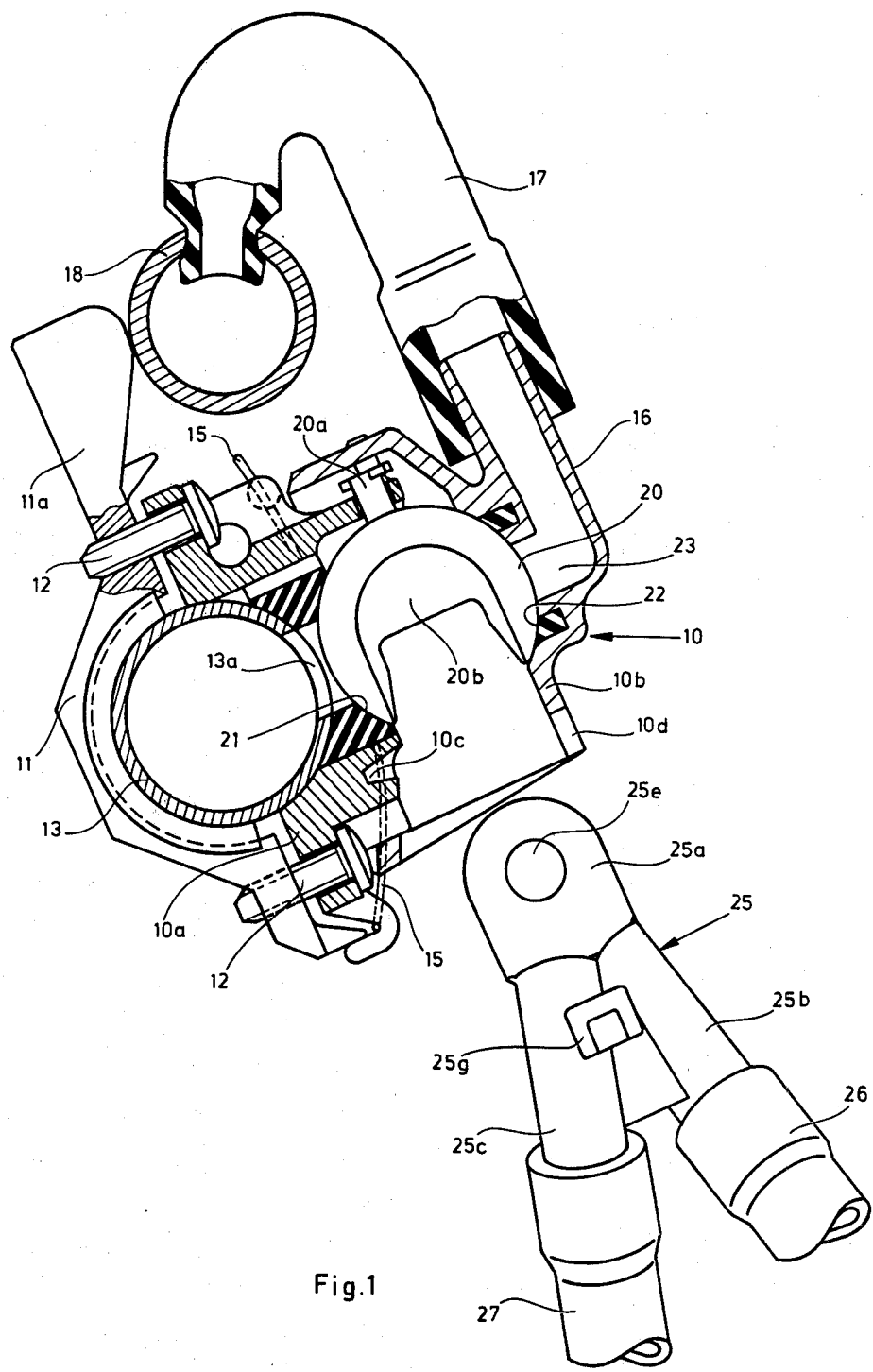

United States Patent [19]

Schulte

[11] 4,376,454

[45] Mar. 15, 1983

[54] VALVE

[75] Inventor: Klaus Schulte, Mölnbo, Sweden

[73] Assignee: Alfa-Laval, Inc., Poughkeepsie, N.Y.

[21] Appl. No.: 241,850

[22] Filed: Mar. 9, 1981

[30] Foreign Application Priority Data

Mar. 7, 1980 [SE] Sweden ............................... 8001789

[51] Int. Cl.³ ..................... F16K 5/20; F16L 37/28; A01J 7/00
[52] U.S. Cl. ................................. 137/798; 137/103; 251/149.8; 251/149.9
[58] Field of Search ............... 251/149.9, 149.8, 149.5; 137/798, 103

[56] References Cited

U.S. PATENT DOCUMENTS 926,415  6/1909  Hooper et al. .................. 251/149.8
2,872,216  2/1959  Kaiser ........................ 251/149.9 X

FOREIGN PATENT DOCUMENTS 1120330  4/1956  France .............................. 251/149.5

Primary Examiner—Arnold Rosenthal
Attorney, Agent, or Firm—Cyrus S. Hapgood

[57] ABSTRACT

A valve for connecting two flexible hoses of a milking machine to a milk line and a vacuum line, respectively, comprises a housing containing two opposite valve seats and a rotatable slide having sealing surfaces cooperating with said seats. The slide is provided with a recess for receiving a connection piece connected to the hoses and having sealing surfaces cooperating with the valve seats. The connection piece is rotatable together with the slide between a connected position in which the hoses are connected to their respective pipe lines, and a disconnected position in which these connections are shut off by the slide. The valve housing is preferably attached to one of the pipe lines and connected to the other one by means of a flexible hose.

5 Claims, 3 Drawing Figures

VALVE

The present invention relates to a valve, especially for connecting a milking machine to a milk line and a vacuum line of a pipe milking plant, comprising a housing attached to a pipe line and a slide rotatable in the housing.

In a pipe milking plant, a milk hose and a vacuum hose are to be connected to a stationary milk line and vacuum line, respectively, at each milking place. These lines usually extend parallel to each other in a common vertical plane.

In order to facilitate the milking work, it is preferable that both hoses can be connected simultaneously to their respective pipe lines by one single manipulation. To this end, a valve arrangement has been proposed which is fixed to both pipe lines and has valve seats aligned with openings provided in the pipes, and a connection piece common to both hoses and attachable in an interlocking manner to the valve in engagement with the valve seats. Such a device makes it possible to simultaneously connect both hoses to the pipe lines, and also to disconnect them therefrom simultaneously. Further, the device is preferably provided with a slide cooperating with the valve seats and closing the openings of the pipes automatically when the connection piece is disconnected.

However, this known valve arrangement has appeared to be disadvantageous in practical use. One reason for this is that it is difficult to make the openings in the pipes with a satisfactory accuracy. Another reason is that the pipes move axially and relative to each other due to temperature variations. Due to the fact that the pipes of a pipe milking plant are often long and that the milk and vacuum pipes are made of different materials and are also subjected to different temperatures during milking, these relative movements may be considerable. This may in turn lead to displacement of the openings of the pipes whereby the sealing and the functioning of the valve are jeopardized.

In order to eliminate the above-mentioned drawbacks, the valve of the present invention is characterized by two valve seats provided in diametrically opposite positions in the housing, said valve seats surrounding openings connected to their respective pipe lines, said slide having sealing surfaces cooperating with said valve seats. A connection piece is adapted to be received in a recess in said slide and has opposite openings each connected to a hose, these openings being surrounded by sealing surfaces cooperating with said valve seats. The connection piece is rotatable together with the slide between a connected position in which each of the hoses is connected to its respective pipe line, and a disconnected position in which these connections are shut off by the slide.

Figures 2, 3:
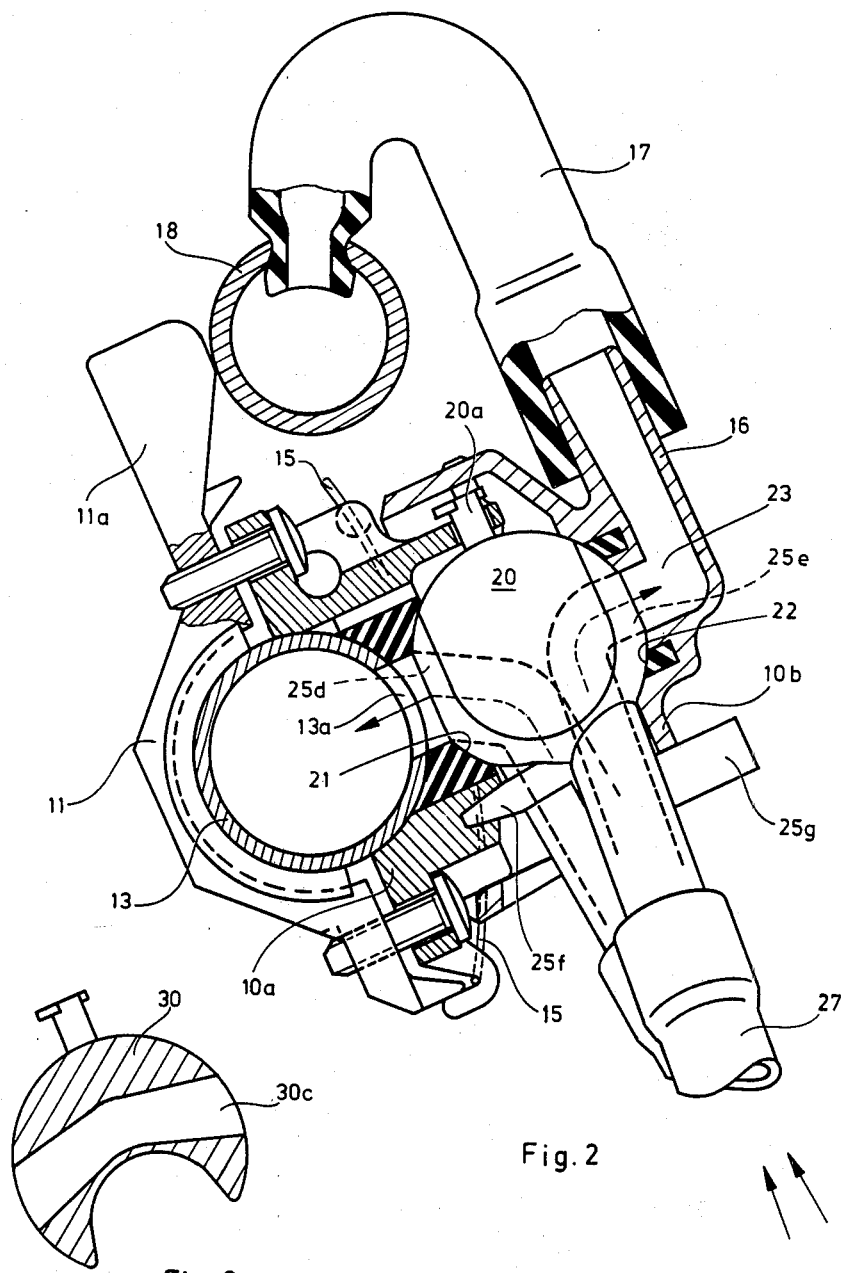

The invention will be described in more detail below with reference to the accompanying drawings, in which FIG. 1 is a cross-sectional view of a preferred form of the valve in a closed and disconnected position, FIG. 2 is a corresponding view of the valve in connected position, and FIG. 3 is a cross-sectional view of another embodiment of a slide which is a part of the valve.

The valve as illustrated comprises a housing 10 having two portions 10a and 10b which are clamped together by a spring indicated at 15. The housing is attached to a milk line 13 by means of a bracket 11 and bolts 12. The housing portion 10b is provided with a hose nipple 16 which is connected to a vacuum line 18 by means of a flexible hose 17. To prevent the housing 10 from rotating around the line 13, the bracket 11 is provided with a supporting lever 11a which abuts the line 18.

A semi-spherical valve slide 20 cooperating with two diametrically opposite valve seats 21 and 22 is provided in the housing 10. One valve seat 21 surrounds an opening 13a in the milk line 13 and the other 22 surrounds the opening 23 of the hose connection 16. Both valve seats are provided with spherical sealing surfaces cooperating with complementary spherical surfaces on the slide 20. The latter is provided with a guide pin 20a journalled in the housing and is rotatable around the axis of said pin, as will be described below.

The slide 20 is adapted to cooperate with a connection piece 25, and to this end it is provided with a recess 20b adapted to receive the head portion 25a of the connection piece. The head portion is shaped to fit in the recess 20b and has spherical surfaces. The connection piece also comprises two hose connections 25b and 25c connected to two opposite openings 25d and 25, respectively, in the head 25a (FIG. 2). A milk hose 26 and a vacuum hose 27 are connected to the hose connections 25b and 25c, respectively, said hoses being connected to a milking machine (not shown).

When the milking machine is to be connected to the lines 13 and 18, the head 25a of the connection piece 25 is introduced into the recess 20b of the slide 20. Together with the slide the connection piece is then turned 90° to the position shown in FIG. 2 and is held fixed in this position by means of a catch 25f engaging in a groove 10c in the valve housing, and a stud 25g abutting a stop 10d in the valve housing and thereby defining the correct angular position of the connection piece.

In the position of FIG. 2, the openings 25d and 25e are aligned with the valve seats 21 and 22, respectively, and consequently the hoses 26 and 27 are connected via the valve to their lines 13 and 18, respectively, as is indicated by dashed lines in the Figure. When the connection is to be interrupted, the connection piece is turned 90° in the opposite direction, the slide 20 resuming its position according to FIG. 1 and sealing against the seats 21 and 22 so that the connection piece may subsequently be disengaged and withdrawn from the valve housing.

As is easily realized, the connection and disconnection operations are easily and quickly carried out by one hand. Due to the fact that the slide 20 and the head 25a of the connection piece have complementary rotary symmetrical surfaces cooperating with the valve seats, the best possible sealing is obtained during the adjustment of the valve.

The slide 30 shown in FIG. 3 has generally the same outer shape as the slide 20 in FIG. 1 but has a through passage 30c. By using such a slide instead of the slide 20, an interconnection is established between the pipe lines 13 and 18 in the disconnected position, which may be preferable in certain types of milking plants, as when both pipe lines are to be flushed through with cleaning liquid. In this position, the passage 30c makes it possible to clean the connection hose 17.

Due to the flexible hose connection 17 between the valve housing and the vacuum line 18, the valve is completely unaffected by relative movements of the pipes 13 and 18, as due to changes of temperature.

As mentioned above, the two portions 10a and 10b of the valve housing are held clamped together by the spring 15. The resilient force is carried by the engaging surfaces of the valve seats 21, 22 and the slide 20 and the head 25a of the connection piece, respectively, whereby the tightness of the valve is ensured. Also, the valve can be very easily disassembled for cleaning or maintenance. To this end, the spring 15 is simply released to allow the portion 10b to be removed, whereby the interior of the valve including the slide and the valve seats is easily accessible.

Although in the above embodiment the valve seats and the sealing surfaces cooperating therewith are spherical, these surfaces may also have other rotary symmetrical shapes, such as cylindrical or conical.

I claim:

1. In combination with two pipe lines, such as a milk line and a vacuum line of a milking system, a valve for connecting said pipe lines to a machine, such as a milking machine, the valve comprising a housing attached to one of said pipe lines, a slide rotatable in the housing, the housing having two openings communicating respectively with said two pipe lines, a pair of valve seats surrounding said two openings, respectively, and located in diametrically opposite positions in the housing, said slide having sealing surfaces cooperating with said valve seats and also having a recess, a connection piece insertable in said recess and having opposite openings, and a pair of hoses of said machine connected to said opposite openings, respectively, the connection piece having sealing surfaces surrounding said opposite openings and cooperating with said valve seats when the connection piece is inserted in said recess, said piece being operable in said recess to rotate the slide between a connected position in which the hoses are connected to respective ones of said pipe lines and a disconnected position in which the hoses are disconnected from said pipe lines.

2. The combination of claim 1, in which said sealing surfaces of the slide and the connection piece are spherical.

3. The combination of claim 1, in which one of said two openings in the housing communicates directly with said one pipe line to which the housing is attached, the combination comprising also a flexible hose connecting the other pipe line to the other of said openings in the housing.

4. The combination of claim 1, in which said slide and connection piece are rotatable about 90° between said connected and disconnected positions.

5. The combination of claim 1, in which said slide has a passage through which the two pipe lines are interconnected when the slide is in said disconnected position.

* * * * *